United States Patent [19]

Melchior et al.

[11] 4,077,219

[45] Mar. 7, 1978

[54] SUPERCHARGED INTERNAL COMBUSTION ENGINES

[75] Inventors: Jean Melchior, Neuilly-sur-Seine; Thierry André, Paris, both of France

[73] Assignee: Etat Francais, Paris, France

[21] Appl. No.: 679,589

[22] Filed: Apr. 23, 1976

[30] Foreign Application Priority Data

Apr. 24, 1975 France .................. 75 12744

[51] Int. Cl.² ............... F02B 33/40; F02B 33/44
[52] U.S. Cl. ........................... 60/599; 60/606
[58] Field of Search ........... 60/599, 604, 605, 606, 60/39.51 R, 611; 123/119 CD

[56] References Cited

U.S. PATENT DOCUMENTS

| | | | |
|---|---|---|---|
| 2,633,698 | 4/1953 | Nettel | 60/599 |
| 2,848,866 | 8/1958 | Geislinger | 60/604 |
| 3,096,615 | 7/1963 | Zuhn | 60/606 |
| 3,103,780 | 9/1963 | Tryhorn | 60/39.51 R |
| 3,450,109 | 6/1969 | Gratzmuller | 60/599 |
| 3,465,518 | 9/1969 | Erwin | 60/39.51 R |
| 3,894,392 | 7/1975 | Melchior | 60/599 |
| 3,949,555 | 4/1976 | Melchior | 60/606 |
| 3,988,894 | 11/1976 | Melchior | 60/606 |

*Primary Examiner*—William L. Freeh
*Assistant Examiner*—L. J. Casaregola
*Attorney, Agent, or Firm*—Barnes, Kisselle, Raisch & Choate

[57] ABSTRACT

A power unit comprises an internal combustion compression ignited engine having variable-volume combustion chambers and supercharged by a turbocompressor having a turbine which receives the engine exhaust gases. A bypass pipe which is permanently open during operation of the engine returns the air not absorbed by the engine to the turbine with a pressure drop which, if appreciable, is independent of the flow rate and increases with the compressor outlet pressure. The power unit comprises a heat exchanger between the gas flow leaving the turbine and the air flow leaving the compressor. An air cooler is disposed in the path of the air travelling from the heat exchanger to the engine.

13 Claims, 3 Drawing Figures

SUPERCHARGED INTERNAL COMBUSTION ENGINES

BACKGROUND AND SUMMARY OF THE INVENTION

The invention relates to power units comprising an internal combustion engine having variable-volume combustion chambers supercharged by a turbocompressor unit having a turbine receiving the engine exhaust gases and comprising a bypass pipe through which the air not drawn by the engine can travel from the compressor to the turbine with a pressure drop which, if appreciable, is substantially independent of the flow rate and increases with the compressor outlet pressure.

While the invention is suitable for use with spark-ignited as well as with compression-ignited engines, with reciprocating piston as well as with rotary engines, it is particularly advantageous in the case of a power unit comprising a Diesel engine having a low volumetric ratio (below 12 and typically between 6 and 10) supercharged by a turbocompressor unit having a high compression ratio. The term "turbocompressor unit" should be interpreted as covering the case where there are several elements and/or stages, the air being cooled if necessary between successive compression elements.

Usually the compression ratio of the compressor is given a value in inverse proportion to the engine volumetric ratio, so as to obtain acceptable combustion pressures for the engine. For example, for an engine having a volumetric ratio of 7, the compression ratio of the compressor will normally be between 6 and 8.

Power units of the kind defined hereinbefore are described in French Pat No. 2,179,310 and in the corresponding U.S. Pat. No. 3,988,894 assigned to the assignee herein. In such power units, the turbocompressor unit can operate like a gas turbine near the surge line, and therefore with high efficiency. If an auxiliary combustion chamber is provided upstream of the turbine, the compressor can operate independently of the engine irrespective of the engine operating conditions (more particularly when the engine is at a stop) and the supercharging pressure can be adjusted by metering the fuel flow rate into the auxiliary chamber.

It is an object of the invention to provide an improved power unit of the above type. It is another object to provide a power unit having a reduced specific consumption, adapted to operate satisfactorily under different conditions (inter alia during idling and low-power operation). It is a more specific object to provide a power unit wherein suitable matching of a turbo-compressor selected so as to be well matched to the engine for operation under the rated conditions (i.e. at high supercharging pressure) is retained at low supercharging pressures.

Power units are known which comprise a supercharged internal combustion engine (without a bypass pipe which is open during on-load operation) and arrangement for facilitating operation at low power (U.S. Pat. No. 2,633,698). That arrangement provides for heating the air entering the engine when starting up at low ambient temperature. Air can be heated before entering the engine by burning fuel, but this method is neither efficient nor economic, since the heating must be intense at low ambient temperatures and the available torque is also very low, since the air intaken by the engine has a lower density and is impoverished in oxygen. A fraction of the engine exhaust gas or of the combustion gases leaving the auxiliary chamber can be recycled to the engine intake, but this method is complex and requires permanent maintainance, since devices for recyling hot gases tend to clog up and it is difficult to build valves which operate satisfactorily if subjected for long time periods to gases at a high temperature. Finally, the air can be heated by compression on starting or during low-power operation, simply by supplying the auxiliary combustion chamber with fuel at a rate sufficient for the supercharging pressure not to fall below a given bthreshold" value. However, the "threshold" pressure must be high if the motor has a low volumetric ratio and if the power unit has to operate at a low ambient temperature. Consequently, this method is uneconomic, since it results in high fuel consumption in the auxiliary chamber. In addition, the engine starter has to be made larger so as to crank the engine at a high supercharging pressure.

According to an aspect of the invention, there is provided a power unit comprising an internal combustion engine having variable volume combustion chambers, a supercharging turbocompressor unit having a compressor and a turbine, the inlet of said turbine being connected to receive the exhaust gas of said engine, pipe means connecting the outlet of the compressor to the intake of the engine, permanently open bypass conduit means having an inlet and an outlet connected to flow the air delivered by said compressor and not drawn to the engine to the inlet of said turbine with a pressure drop which, if appreciable, is substantially independent of the flow rate in the bypass conduit and increases with the output pressure of the compressor, and heat exchanger means between pressurized air flow from the compressor to the engine and bypass conduit means and the gas flow from the turbine outlet to atmosphere.

The aforementioned arrangement combines the known advantage of a heat exchanger in regenerative operation, i.e. reduced fuel consumption in the auxiliary combustion chamber and silencing of the turbine exhaust, with heating of the air intaken by the engine, without the need to immerse valve means in hot exhaust gases.

The heat exchanger may be swept by the entire flow of air travelling from the compressor to the engine and the bypass pipe. An air cooler provided with control and regulating means may be disposed in the path of the air travelling from the heat exchanger to the engine intake manifold. By modulating the heat transfer in the air cooler, e.g. by varying the flow rate of cooling fluid (air or liquid) through it, the temperature of air entering the engine can be maintained at a level above the self-ignition threshold in the engine combustion chambers, but can be kept low enough to avoid the harmful effect of reducing the air density and overheating the engine at high power. The modulation can be made without using components exposed to high temperature, and the system is largely self-regulating.

It can be seen that the arrangement according to the invention is paradoxical, since the air leaving the compressor first circulates through a heat exchanger for heat exchange with the turbine exhaust gases (a process used in prior art installations for heating the air) and then circulates through an air cooler before it is drawn by the engine. The arrangement will undoubtly be considered as erroneous by a technician in the relevant field, who at first sight would reject it. However, surprising advantages of the invention can be determined by attentively examining operation under all conditions and by taking account of the fact that, at low power, heat transfers in the cooler are reduced to a minimum, whereas at high power the air is hardly heated at all or is even cooled in the exchanger, whose function in the power unit of this invention is appreciably different from the function of an air heater supplied by a fraction of the gases leaving the turbine in a conventional installation.

To obtain such advantages, control and regulating means are typically provided which:

put the cooler out of action during starting, idling and low-load operation (e.g. as long as the pressure of the air intaken by the engine is below a predetermined value) and subsequently give the cooler an efficiency which is substantially proportional to the engine speed and the pressure of the air intaken by the engine.

The invention is of particular interest in the case of a power unit comprising a turbocompressor having a high rated pressure ratio (about 6) and a high overall efficiency (the overall efficiency being equal to the product of the isentropic efficiencies of the compressor and turbine, and of the mechanical and volumetric efficiency, and should be considered high when it exceeds approx. 0.6), associated with an engine having a low volumetric ratio. Then, as will be shown hereunder, the heat exchanger acts as an air heater during low-power operation (corresponding to low supercharging pressures, where it is necessary to heat air entering the engine for the purpose of self-ignition) but operates as a cooler when air enters the engine at high power, since the temperature of the turbine exhaust gases is below the temperature of the air leaving the compressor, so that, in order to obtain maximum power, the air from the compressor must be cooled before entering the engine. Consequently, the air cooler, which is disposed upstream of the engine intake manifold, can be designed to have a lower transfer power than would be required from a cooler acting alone, i.e. capable of lowering the temperature of the air delivered by the compressor to a temperature acceptable for the engine under the most unfavourable conditions, i.e. at high power. Finally, by an effect which may be termed "thermal" obstruction of the engine intake, the invention ensures that the compressor remains matched with the engine, which constitutes a positive displacement machine, down to low values of the supercharging pressure.

SHORT DESCRIPTION OF THE DRAWINGS

The invention will be more clearly understood from the following description of power units constituting non-limitative embodiments thereof. The description refers to the accompanying drawings in which:

FIG. 1 is a block diagram showing the main components of the power unit;

FIG. 2 is a temperature-pressure ratio diagram illustrating varying conditions of temperature in dependence on the compression ratio in a typical power unit in accordance with FIG. 1; and FIG. 3 is a diagram for showing the problems of matching the compressor to the engine in the low zone of the characteristic, i.e. when the compressor operates at a low compression ratio and a low flow rate while supplying a positive displacement engine, and also for illustrating the invention.

DETAILED DESCRIPTION OF A PREFERRED EMBODIMENT

Figure 1:
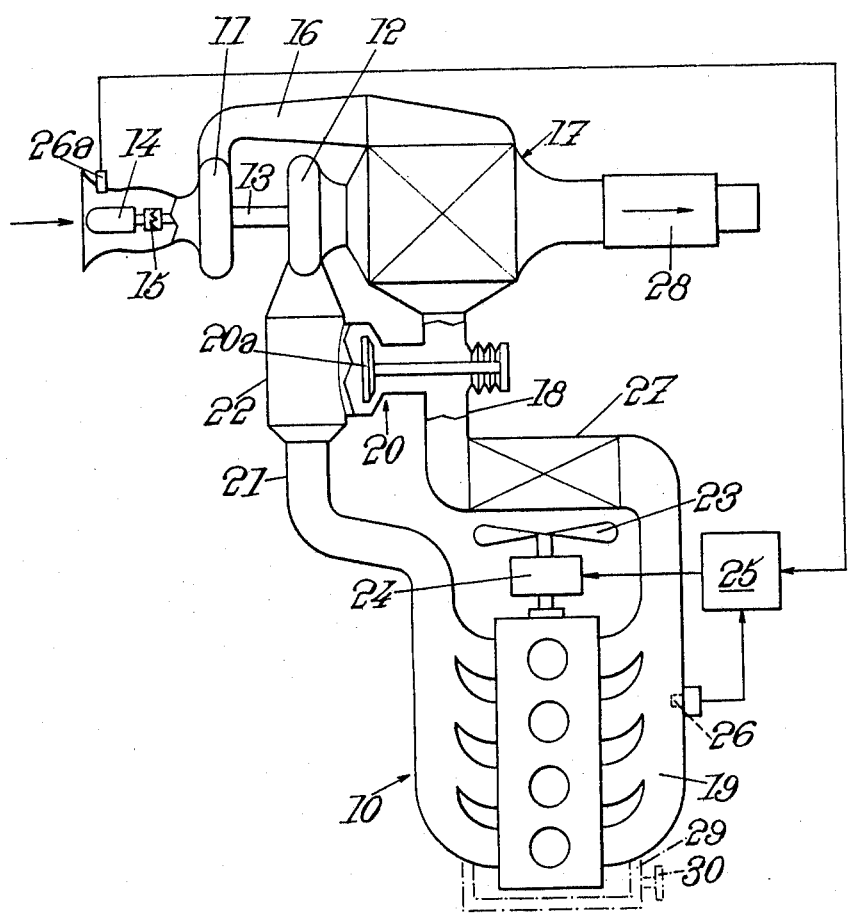

Referring to FIG. 1, there is shown a power unit which comprises an internal combustion engine 10 which will hereinafter be assumed to be a four-stroke (i.e. positive displacement) alternating (reciprocating piston) engine having a volumetric ratio below 12. An engine of this kind, particularly if its bore is small, cannot start without supercharging unless a special procedure is used, e.g. temporary use of very volatile fuel. Engine 10 is supercharged by a turbocompressor unit comprising a compressor 11 and a turbine 12 whose rotors are coupled by a shaft 13. A starting motor 14 in the compressor air intake can be coupled to shaft 13 by a clutch 15 so as to crank the turbocompressor. The compressor has a high compression ratio, preferably higher than 6. Compression ratios of this order can be provided with existing high efficiency supersonic compressors comprising a single body and one or more stages. Alternatively, the compressor used can have two bodies, with or without intermediate cooling. For example, aircraft compressors manufactured by the French Company "TURBOMECA" reach compression ratios of 8 with an isentropic efficiency of more than 80%. The compressor outlet is connected to a delivery pipe 16 which opens into a heat exchanger 17, which may be of any type which does not involve mixing of the two flows. In other words, the heat exchanger comprises two independent circuits. The exchanger may inter alia comprise plates or tubes swept by the fluids.

The air leaving exchanger 17 can be directed to either of two paths. One path comprises a pipe 18 which is connected to the intake manifold 19 of engine 10 and comprises an air cooler 27 which will be described in greater detail hereinafter. The other path is a bypass pipe 20. The air fraction which flows through the bypass pipe rejoins the engine exhaust gases supplied by a pipe 21, upstream of the inlet of turbine 12. Thus, pipe 20 is in parallel flow relation with the engine 10 and the cooler 27. In the embodiment illustrated by way of example in FIG. 1, pipe 20 opens into an auxiliary combustion chamber 22 which also receives the engine exhaust gases. The combustion chamber may inter alia be of the kind described in French Pat. No. 2,179,309 corresponding to U.S. Pat. No. 3,988,894 assigned to the assignee herein.

The bypass pipe 20 has throttle means 20a which have a progressively variable flow cross-sectional area and are automatically actuated so as to maintain, between the compressor outlet and the turbine inlet, a pressure difference which almost exclusively depends on the pressure in the bypass pipe upstream or downstream of the throttle means (upstream in the case illustrated). The throttle means shown in the diagram are of the kind described in French Pat. No. 2,179,310 (U.S. Pat. No. 3,988,894), but use can be made of any other throttle means which achieves the same results, i.e. in practice provides a pressure drop which is independent of the ratio between the flow rate through the bypass pipe and the flow rate supplied by the compressor (i.e. independent of the engine speed at a given power thereof).

The supercharging air cooler 27 illustrated by way of example in FIG. 1 is cooled by atmospheric air circulated by a fan 23. The fan is coupled to the shaft of engine 10 by a speed variator 24 having a ratio set by e.g. electric actuating means 25 which are sensitive to one or more engine operating parameters such as the temperature and/or pressure in the intake manifold 19, as measured by a pick-up 26, and/or the ambient temperature, as measured by a pick-up 26a. Alternatively, if the engine is water-cooled, cooler 27 can be flowed through by the water for cooling engine 10, in which case the amount of heat absorbed by cooler 27 can be adjusted by acting on a throttle valve in the water circuit (or, more generally in the circuit of the liquid cooling the engine). The operation and structure of electric circuit 25 will be described in detail hereinafter.

Finally, after travelling through turbine 12, the exhaust gases are introduced into the heat exchanger, from which they escape to atmosphere at 28.

The favourable effect of the heat exchanger 17 on consumption in the auxiliary combustion chamber 22 is comparable with the effect in regeneration gas-turbine installations, and will therefore not be described in detail. However, it should be noted that, when the compressor 11 operates at a low flow rate and consequently with a low compression ratio (e.g. 2) and has an isentropic efficiency of 0.75, the fuel consumption in the auxiliary chamber is reduced by a factor of the order of 2, even with a heat exchanger having an efficiency not exceeding 60%.

In a power unit of the kind defined hereinbefore, the heat exchanger also largely eliminates the problem of maintaining the air inlet temperature at a value sufficient to produce self-ignition in the engine cylinders. The advantages of the previously-described feature will be more apparent when referring to FIG. 2, which shows the temperatures at various places in the installation plotted against the compression ratio $p_2/p_1$ of the compressor ($p_1$ denoting the total input pressure into the compressor, i.e. substantially atmospheric pressure, and $p_2$ the total output pressure of the compressor) or against the absolute output pressure at constant atmospheric pressure.

Figure 2:
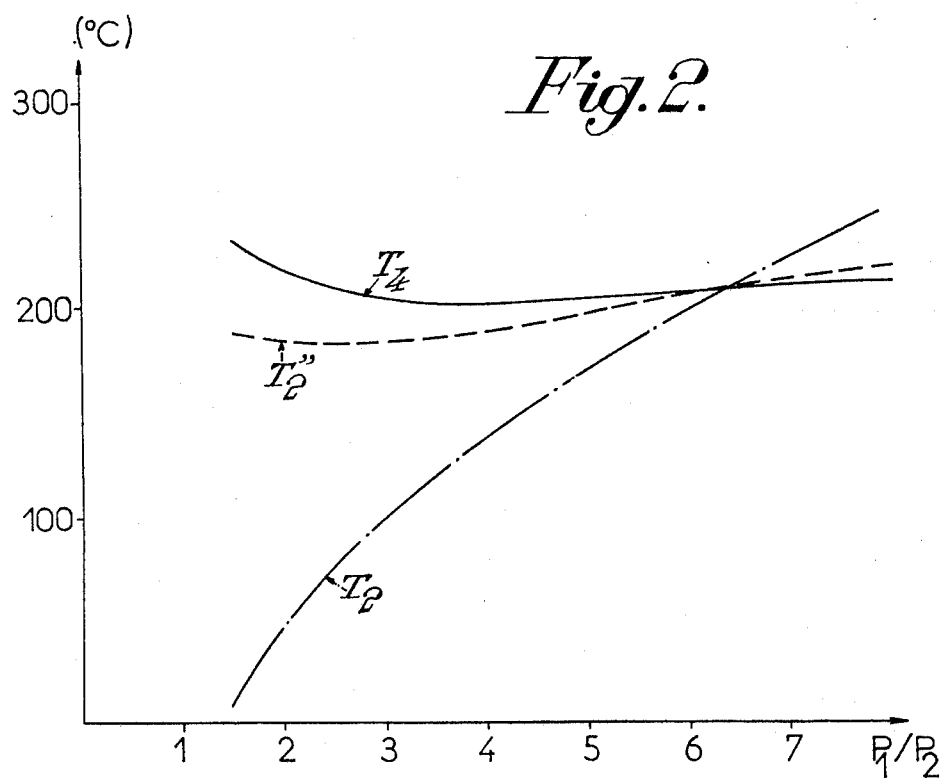

The curves in FIG. 2 shows the variations of air temperature $T_2$ at the compressor outlet (dash-dot curve), of the air temperature $T''_2$ at the heat-exchanger outlet (chain-line curve), and of the gas temperature $T_4$ at the turbine outlet and the exchanger inlet (curve in full line). In the example shown, the ambient temperature $T_1$ is $-20°$ C, the polytropic efficiency is 0.80 for the turbine and for the compressor, and there is a 10% relative pressure drop between the compressor and turbine (as adjusted by the throttle means 20). The curve representing the variations of $T''_2$ vs the compression ratio corresponds to an efficiency of 0.8 of the heat-exchanger 27 (the efficiency being defined as the ratio between (a) the temperature difference in the air between the inlet and the outlet, and (b) the difference between the gas inlet temperature and the air inlet temperature). Since an efficiency of 0.8 requires a bulky heat exchanger, a lower efficiency of e.g. 0.5-0.6 will generally be accepted when the available volume is limited.

Assuming that the exchanger efficiency is constant, the temperature $T''_2$ of the air leaving the heat exchanger 17 and flowing to the cooler 27 varies only very slightly with the compression ratio $p_2/p_1$, i.e. with the supercharging pressure. In addition, the temperature is substantially independent of the engine running speed at constant power, due to the presence of the bypass pipe. More specifically, it can be seen that $T''_2$ varies between approx. 185° C and 215° C when the compression ratio and the rate of flow delivered by the compressor vary between 1.5 and 7. The result is a very marked reduction in the variations in the air temperature when compared with the temperature at the compressor outlet, which varies from approx. 10° C to 230° C in the same range of compression ratios.

It can be seen that the reheating provided by heat exchanger 17 is particularly marked at low supercharging pressures, when the engine needs particularly hot air for compression-ignition and simultaneously a large supply of heat has to be added by chamber 22 to that supplied by the engine exhaust gases, so that the turbocharger unit can operate. At low supercharging rates, the fuel saving is very high since, first, there is obtained an increase of the temperature of the engine exhaust gases due to the air intake temperature being raised and, second, the air entering the auxiliary combustion chamber 22 is already heated by exchanger 17.

On the other hand, heat transfer from the turbine output gas to air decreases when the supercharging pressure increases, when the engine no longer needs reheated intake air and the engine exhaust gases supply enough energy to drive the turbine without reheat by the auxiliary combustion chamber.

It can be seen, therefore, that the system is self-regulating, since the air temperature at the outlet of heat exchanger 27 varies much less than the inlet air temperature.

If the efficiency of the heat exchanger is lower than indicated above, the curve showing the variation of $T''_2$ in dependence of $p_2/p_1$ has a steeper slope, but still intersects the curve representing $T_2$ at the same value of the compression ratio. In each case, the most favourable compromise will be selected taking account of the volume of the heat exchanger (which determines its efficiency) and the heat recovery obtained.

When the compressor operates at a low compression ratio and a low air flow rate and the engine runs idle, the speed variator 24 is actuated in response to a signal received from probe 26 and/or probe 26a, so as to reduce to a minimum the cooling of the air, if necessary by stopping fan 23 (provided fan 23 is distinct from the engine cooling fan). On the other hand, as the compression rate of the compressor and the load of the engine increase, the supercharging air cooler is put into operation and restores the temperature of the air entering the engine to a value favourable to good filling of the engine cylinders, but without cooling the air sent to the auxiliary combustion chamber 22.

The curves in FIG. 2, which correspond to an installation comprising a compressor having a relatively high efficiency (0.8), show another advantage of the invention, when operation is at high power, near the rated point. In a conventional power until comprising an engine supercharging air cooler, the cooler must be dimensioned in dependence on the maximum amount of heat to be taken from the air, corresponding to maximum engine power. The air cooler of the power unit shown in FIG. 1 can be of lesser power and smaller size, since under maximum-power conditions the heat exchanger 17 operates not as a heat recovery system, but as an additional cooler. As FIG. 2 shows, the temperature $T_4$ of the gases at the turbine outlet becomes lower than the temperature $T_2$ of the air at the outlet of compressor 11, when the compression ratio rises above 6 approximately. The cooling effect of heat exchanger 17 becomes more and more marked as the compression ratio increases.

It might be thought that this advantage is counterbalanced by the fact that the air entering the combustion chamber 22 is also cooled by the heat exchanger 17. Actually, this cooling is not a disadvantage, since, at high power, the energy represented by the heat in the engine exhaust gases is sufficient to drive the turbine without burning fuel in chamber 22.

If the compressor is less efficient (e.g. 0.75), the turbine outlet temperature can remain above the air temperature at the compressor outlet over practically the entire operating range of the installation, but the other advantages of the invention are retained.

In addition, exchanger 17 makes it possible to solve a problem which exists where the internal combustion engine 10 is of the positive displacement kind (e.g. a four-stroke engine). The problem appears in FIG. 3, which shows the variation in the flow rate absorbed by the engine (curve M) and in the flow rate supplied by the compressor (curve C) in dependence on the compression ratio, i.e. substantially on the supercharging pressure.

Figure 3:
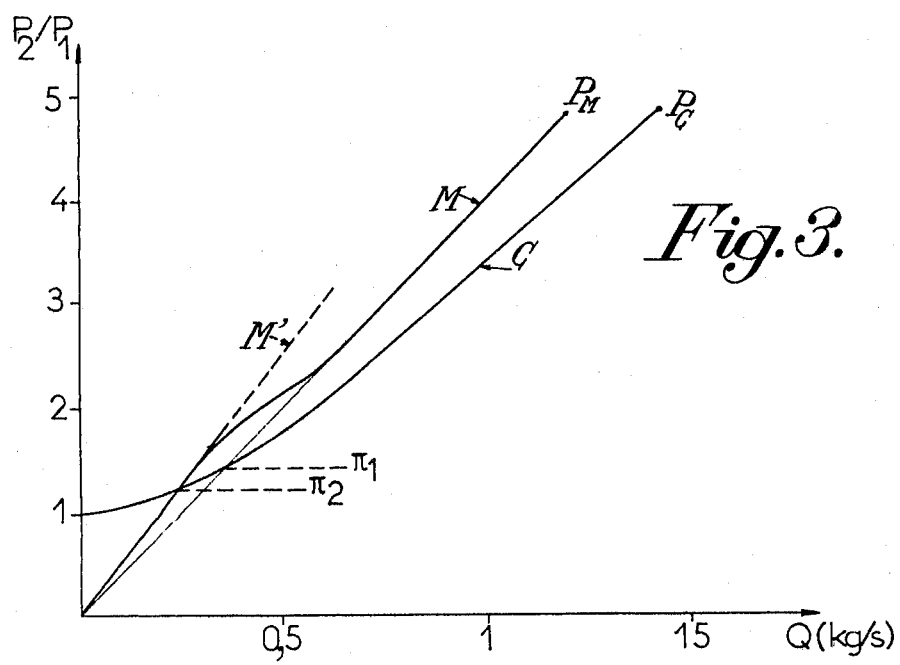

The supercharging turbocompressor is chosen so as to be matched to engine 10 when the latter operates at the rated point $P_M$ on FIG. 3. For the purposes of this adaptation, at the rated point compressor 11 delivers the air intaken by the engine and an additional supply (typically 5–15% of the flow rate intaken by the engine) for the following purposes:

maintaining a well-defined pressure difference between the outlet of compressor 11 and the inlet of turbine 12, providing the air necessary for supporting combustion of the pilot burner in the auxiliary combustion chamber 22, cooling the hot engine components by a flow of air, and supplying a reserve air capacity allowing for variations in ambient conditions and clogging.

If the air intaken by the engine is maintained at a substantially constant temperature, the curve representing the flow rate/pressure characteristic of the engine at constant speed is a straight line passing through the point corresponding to $P_2/P_1 = 0$ and $Q = 0$. On FIG. 3, curve M corresponds to the maximum speed of engine 10 (e.g. 2500 rpm) and to an air intake temperature of 100° C.

On the other hand, as in the case of a gas turbine, the point representative of turbocompressor operation moves along a curve C, the concavity of which faces the pressure axis, near the surge line to obtain high efficiency. Curve C passes:

via a rated adaptation point $p_c$ corresponding to rated pressure and to an air flow rate between 5 and 15% higher than the rate absorbed by the motor, and the point corresponding to $Q = 0$ and $P_2/P_1 = 1$.

Thus, lines C and M intersect at a point corresponding to compression ratio $\pi_1$. If the supercharging pressure was allowed to fall below $\pi_1$, the direction of flow in the bypass pipe would reverse, the auxiliary chamber would be extinguished and the pressure drop would no longer be well-defined and act in the appropriate direction. With the combustion chamber cut-off, it would be impossible to accelerate the engine.

An obvious way of avoiding this risk would be to control the flow rate of fuel into the auxiliary combustion chamber so as to prevent the supercharging pressure from falling below $\pi_1$ (or rather below a value higher than $\pi_1$ allowing for air drains and for the combustion-supporting air required in the auxiliary chamber). This approach results in wastage of fuel during idling, insofar as maintenance of the value $\pi_1$ is not necessary for self-ignition by compression in engine 10 (that situation being found if the engine has a sufficiently high volumetric ratio or is not designed to operate at a very low ambient temperature).

The problem (which has no counterpart in power units not comprising a permanently open bypass pipe), is solved by locating heat exchanger 17 in the part of the air entering engine 10, since the exchanger limits the mass flow rate absorbed by the engine at low power, by means of a phenomenon which can be called "thermal obstruction". This limitation is in no way disadvantageous for the engine, since only a fraction of the air leaving the compressor is needed to supply the oxygen for burning the small flow rate of fuel which under such operating conditions is admitted into the combustion chambers of the engine.

FIG. 2 shows that at low power, in the operating regions where there is considerable heat transfer between the exhaust gas and the incoming air, the engine inlet can be maintained at or above 185° C at an ambient temperature down to $-20°$ C, by eliminating the effect of the cooler 27 (whereas under load conditions it is advantageous to maintain the temperature at which air enters the engine at a considerably lower value, e.g. 100° C in the case of an engine having a volumetric ratio of 9). In this operating range, the thermal obstruction is obtained by reducing the density of air (i.e. the mass flow intaken by the engine) in the ratio:

$$(100 + 273)/(185 + 273) \approx 0.8$$

for an ambient temperature of $-20°$ C.

The effect of exchanger 27 is to deform the lower part of curve M. The portion of M near the origin is modified to correspond to the line M' corresponding to an air temperature of 185° C at the engine intake. Thus, the point of intersection with curve C is appreciably lower. In FIG. 3, for example, it corresponds to a value $\pi_2$ of about 1.2 instead of 1.5.

Thus, two favourable results are obtained simultaneously: fuel is saved at low power and the engine starting motor can be less powerful, since the supercharging pressure which prevails when the engine is cranked with the turbocompressor already in operation is appreciably decreased.

In a typical case (an 800 HP Diesel engine at 2500 rpm associated with a compressor having a rated compression ratio of 4.8 and an isentropic efficiency of 0.75), the fuel consumption in the auxiliary chamber during idling is reduced in a ratio of 2.4 to 1 (1.91 due to heating by the exchanger operating at a heat regenerator having an efficiency of 0.6, and 1.25 due to the thermal obstruction).

If the engine is not of the positive displacement type and is, for example, a two-stroke engine, the characteristic M does not pass through the origin (the engine speed and the air intake temperature being constant), since the intaken flow rate becomes zero if the ratio $p_2/p_1$ becomes equal to unity. There is no longer a problem of low-power or "low" adaptation, but the invention retains its other advantages as previously defined.

It has already been stated that the air exchanger acting for heat recovery supplies air at a temperature which varies only slightly in dependence on the compression ratio $P_2/P_1$. The temperature is e.g. slightly less than 200° C in the case illustrated in FIG. 2, in which the ambient temperature is −20° C. It will be slightly less than 300° C for an ambient temperature of +40° C. The temperature is higher in the case of an installation wherein the compressor has a lower isentropic efficiency (e.g. 0.75 instead of 0.8).

During idling and at low power, the air can be allowed to enter the engine without being cooled. During normal operation, on the other hand, the air temperature must be kept at a lower value, e.g. 100° C in an engine having a volumetric ratio of 9. A method of regulating cooler 27 so as to achieve this result will now be described.

The heating power $Q_{th}$ to be taken away from air in the cooler 27 is proportional to $N.P_2 (T''_2 - T'_2)$, N being the engine speed. If $T''_2$ remains approximately equal to 200° C and $T'_2$ has to be lowered to 100° C, the power $Q_{th}$ is proportional to the speed N and the supercharging pressure $P_2$; it is therefore sufficient to give the cooler an efficiency proportional to the speed and to a signal which is a linear function of pressure $P_2$.

In the embodiment illustrated in FIG. 2, the cooler means comprises a heat exchanger flowed through by a stream of air driven by a fan 23 coupled to the engine shaft by a speed variator 24. Thus, the fan speed is in direct proportion to the engine speed, the proportionality coefficient being adjusted by variator 24. The variator ratio is in turn controlled by means 25 at a value which varies with the pressure in the intake manifold 19. Numerous kinds of variators can be used, inter alia those comprising a pulley having two cones which engage in one another to a varying extent so as to modify the effective radius of the pulley. In such cases, means 25 can comprise an electric or fluid-pressure actuator which axially moves the two cones with respect to one another and which is controlled by a conventional servocircuit.

Alternatively, use can be made of a cooler wherein the cooling fluid is a liquid circulated by a pump driven by the engine. The pump can be driven by the engine via a variator or can be directly driven by the engine, if there is provided a throttle valve controlled by circuit 25 for impressing an appropriate head loss to the liquid flow. For example, a bypass pipe bypassing the water pump, driven by the engine, can be provided with the throttle valve controlled by the supercharging pressure. In the case of air cooling, the air intake cross-section of fan 23 can be varied. Variator 25 can take account not only of the pressure in the intake manifold but also of other operating parameters. One important parameter is the ambient temperature, since heat exchanges in the cooler are directly influenced thereby.

By the way of example, normal operation of the engine and a method of starting the engine which does not require the conventional substitutes for facilitating the starting of Diesel engines (e.g. injection of volatile fuel into the combustion chambers, heating of the intake manifold, introducing volatile fuel into the intake manifold, etc.) will now be described.

While engine 10 is inoperative, the turbocompressor is driven by starter 14 and simultaneously fuel is supplied to the auxiliary combustion chamber 22. The turbocompresser rapidly becomes independent and its speed increases. The flow rate of fuel injected into chamber 22 can be automatically regulated in dependence on the available air flow rate.

When the turbocharger operates at full speed and chamber 22 receives a maximum flow of fuel, air under pressure at a high temperature (about 200° C in the present case) is available at the outlet of heat exchanger 17. This temperature is sufficient for engine 10 to start under the action of a starting motor (not shown) normally. Although however cooler 27 is inoperative, it has a thermal inertia which may be sufficient, in cold weather, for the air entering manifold 19 to be cooled so much that the engine cannot start.

In the embodiment illustrated in FIG. 1, use may be made of the pressure difference produced by the throttle means 20. A temporary heating flow through the cooler is produced via a pipe 29 of small cross-sectional area provided with a manual or automatic shut-off valve 30 connecting the intake manifold 19 to the exhaust manifold of engine 10. When the engine is stopped and valve 30 is open, a fraction of the hot air from exchanger 17 flows through cooler 27, the intake manifold 19 and the exhaust manifold, and heats them. It is thus possible to crank the engine to start the same a few seconds after the turbocompresser operates at full speed.

As soon as the engine has started, valve 30 is manually or automatically closed (e.g. by the increase in the oil pressure in the engine lubricating circuit). As long as the engine is idling, cooler 27 remains inoperative (the control circuit 25 can be adapted to keep fan 23 out of operation up to a given value of $p_2$). The flow rate of fuel injected into the auxiliary combustion chamber 22 is maintained at a value such that the engine intake pressure is above a threshold value below which there is no self-ignition by compression in the engine cylinders. That threshold value must be greater than $\pi_2$.

When a load is impressed to the engine, the flow rate of fuel injected into the cylinders thereof increases and the flow rate of fuel injected into the auxiliary combustion chamber correspondingly decreases until it is just sufficient to maintain a pilot flame, which continues to burn even when the engine reaches its rated operating point $P_M$. In proportion as the load increases, the speed variator increases the fan speed for a given engine speed.

Finally, if the engine is unloaded when rotating at full speed (e.g. in the case of a vehicle going down a steep slope with the engine exerting a retarding force), the corresponding operating points for the compressor and engine move towards the origin along characteristics M and C (FIG. 3) and the combustion chamber is supplied with fuel at a considerable flow rate to maintain the minimum supercharging pressure needed for self-ignition and ensure that the flow rate into the bypass pipe is sufficient to burn the fuel injected into the auxiliary chamber 22. At the same time, the variator 25 stops fan 23, or reduce its driving ratio to a minimum.

The preceding description relates to an installation comprising starting means for starting the turbocharger unit before the engine starts. Such starting means may be dispensed with. While the invention facilitates starting of the engine, it also improves operation under other conditions, i.e. idling or low power, and can thus also be applied to power units where the engine is started by other means.

We claim:
1. A power unit comprising:
an internal combustion engine having variable volume combustion chambers,
a supercharging turbocompressor unit having a compressor and a turbine, the inlet of said turbine being connected to receive the exhaust gas of said engine, pipe means connecting the outlet of said compressor to the intake of said engine, bypass conduit means having an inlet and and outlet always connected and open during operation of said turbocompressor unit to flow the air delivered by said compressor and not drawn by said engine to the inlet of said turbine with a pressure drop which, if appreciable, is substantially independent of the flow rate in the bypass conduit and increases with the output pressure of said compressor, heat exchanger means located upstream of the junction of the inlet of said bypass conduit means with said pipe means and operable to exchange heat between the pressurized air flow from said compressor to the engine and to said bypass conduit means and the gas flow from the turbine outlet to atmosphere, and air cooling means located in the air path between said compressor and the intake of said engine downstream of the junction of the inlet of said bypass conduit means with said pipe means so as to be flown only by the air drawn by said engine.

2. A power unit comprising:

an internal combustion engine having variable volume combustion chamber, a supercharging turbocompressor unit having a compressor and a turbine, the inlet of said turbine being connected to receive the exhaust gas of said engine, pipe means connecting the outlet of said compressor to the intake of said engine, bypass conduit means having an inlet and an outlet always connected and open during operation of said turbocompressor unit to flow the air delivered by said compressor and not drawn by said engine to the inlet of said turbine with a pressure drop which, if appreciable, is substantially independent of the flow rate in the bypass conduit and increases with the output pressure of said compressor, an auxiliary combustion chamber connected to receive air from said bypass conduit means and to deliver combustion gas to said turbine, heat exchanger means located upstream of the junction of the inlet of said bypass conduit means with said pipe means and operable to exchange heat between the pressurized air flow from said compressor to said engine and to said bypass conduit means and the gas flow from the turbine outlet to atmosphere, and air cooling means located in the air path between said compressor and the intake of said engine downstream of the junction of the inlet of said bypass conduit means with said pipe means so as to be flown only by the air drawn by said engine.

3. A power unit according to claim 2, wherein said engine is a diesel engine having a compression ratio lower than 12, wherein said compressor has a high compression ratio and efficiency and wherein said turbocompressor unit is matched to said engine to operate along a characteristic line in the zone of maximum efficiency thereof, and wherein the air cooling means are undersized as compared with the air cooling means which would be necessary in the absence of said heat exchanger means.

4. A power unit according to claim 3, wherein said compressor has a nominal pressure ratio in excess of 6 and an isentropic efficiency of about 0.8.

5. A power unit according to claim 2, wherein said air cooling means is provided with control means responsive to the speed of the engine and operable to adjust the dissipated thermal flow substantially proportional to the speed of said engine and to the pressure of the air drawn by said engine.

6. A power unit according to claim 5, wherein said control means comprises means responsive to the conditions which prevail during cranking, idling and low power operation of the engine for rendering said cooling means inoperative under such conditions.

7. A power unit according to claim 6, wherein said control means are arranged to render the air cooling means inoperative as long as the pressure of the air in the intake of the engine is lower than a predetermined value.

8. A power unit according to claim 6, wherein the control means are responsive to the ambient temperature for increasing the dissipated thermal flow responsive to an increase of said ambient temperature.

9. A power unit according to claim 3, wherein said engine and said air cooling means are cooled with atmospheric air, further having blower means driven by the engine through transmission means having an adjustable transmission ratio and control means for adjusting said transmission ratio as a function of the pressure of air in the intake of the engine.

10. A power unit according to claim 2, further comprising means for cranking said turbocompressor, which cooperate with said auxiliary combustion chamber for bringing the turbocompressor to self-sustaining operation prior to engine cranking.

11. A power unit according to claim 10, further having a branch circuit connected between the intake and the exhaust of the engine for circulating a restricted flow of pressurized air from the outlet of the heat exchanger across the air cooling means to heat the same prior to cranking said engine for starting.

12. A power unit according to claim 5, wherein said air cooling means comprises a second heat exchanger defining a path in said pressurized air flow from said compressor to said engine, fluid moving means for circulating a cooling fluid across said second exchanger means, said fluid moving means being drivably connected to said engine, and means for controlling the flow of fluid delivered from said fluid moving means to said second heat exchanger comprising a probe delivering a signal representative of the pressure of the air charged into the engine and adjusting said flow in proportion to the said pressure.

13. A power unit according to claim 12, wherein said fluid moving means comprises rotary fan means for circulating atmospheric air to thereby provide said cooling fluid, said flow controlling means comprising a speed variator having an adjustable transmission ratio and operably interconnecting said fan means to said engine, said probe being operable to deliver said signal to control said ratio of said variator transmission.

* * * * *

UNITED STATES PATENT AND TRADEMARK OFFICE
CERTIFICATE OF CORRECTION

PATENT NO. : 4,077,219

DATED : March 7, 1978

INVENTOR(S) : Jean F. Melchior and Thierry Andre

It is certified that error appears in the above-identified patent and that said Letters Patent are hereby corrected as shown below:

Column 2, line 11, change " tthreshold" " to -- "threshold" --
Column 4, line 47, "3,988,894" should read -- 3,849,988 --
Column 8, line 10, "part" should be -- path --

Signed and Sealed this

Third Day of October 1978

[SEAL]

Attest:

RUTH C. MASON
*Attesting Officer*

DONALD W. BANNER
*Commissioner of Patents and Trademarks*